United States Patent Office 2,946,801
Patented July 26, 1960

2,946,801

PRODUCTION OF PYRIDINE CARBOXYLIC ACIDS

Ellis K. Fields, Chicago, Ill., assignor to Standard Oil Company, Chicago, Ill., a corporation of Indiana No Drawing. Filed June 5, 1957, Ser. No. 663,603

9 Claims. (Cl. 260—295)

This invention relates to an improved process for the production of pyridine carboxylic acids by catalytic oxidation of heterocyclic nitrogen compounds containing a pyridine nucleus having an oxidizable organic grouping attached to the nucleus by a carbon-to-carbon linkage, and capable of being oxidized to a carboxylic acid. The invention relates particularly to the production of pyridine carboxylic acids from alkyl substituted pyridines, and especially to the production of pyridine 4-carboxylic acid from alkyl pyridines substituted in the 4 position. A particular aspect of the invention relates to the production of isonicotinic acid by selective oxidation of 4-methyl pyridine in admixture with isomeric methyl pyridines.

Pyridine carboxylic acids are commercially valuable organic compounds useful for the preparation of derivatives having wide utility in medical and pharmacological applications. The 3-carboxy compound, nicotinic acid, is of value in vitamin preparations, and pyridine 4-carboxylic acid (isonicotinic acid) enjoys wide use for the prepartion of therapeutic agents, for example, as the hydrazide derivative in the treatment of tuberculosis.

Commercially useful pyridine carboxylic acids have been prepared by chemical oxidation of analogous alkyl substituted pyridines, for example by oxidation with aqueous solutions of potassium permanganate, by oxidation with nitric acid in the presence of sulfuric acid at temperatures above about 250° C. and by oxidation with sulfuric acid in the presence of a selenium catalyst at about 275° C. Other procedures for the oxidation of alkyl substituted pyridines known in the art involve the conversion of the pyridine compounds to hydrogen halide salts and oxidation thereof with chemical oxidants such as elemental chlorine.

The oxidative processes which have been utilized for the preparation of pyridine carboxylic acids by oxidation of alkyl substituted pyridines have invariably depended upon the action of chemical oxidants, and have been attended by relatively high expense, low yields and low conversions requiring recycle of unoxidized starting material with attendant high cost of the desired product. In addition, isolation of pure pyridine carboxylic acids has hitherto involved many tedious manipulations.

I have now discovered that heterocyclic nitrogen compounds containing a pyridine nucleus substituted in the 4 position by an oxidizable organic group can be oxidized in the liquid phase with molecular oxygen in the presence of a metallic oxidation catalyst to give high yields of isonicotinic acid of excellent purity. I have further discovered that in accordance with the process of my invention, mixtures of isomeric alkyl substituted pyridines can be selectively oxidized so as to convert only the compounds substituted in the 4 position to the carboxylic acid derivative.

My invention thus has as one of its principal objects the production of isonicotinic acid by oxidation of a heterocyclic nitrogen compound containing a pyridine nucleus substituted in the 4 position by an oxidizable organic grouping. A further object of my invention is the selective oxidation of a compound having a pyridine nucleus substituted in the 4 position in the presence of isomeric alkyl substituted pyridines. Another object of my invention is the provision of a process for the separation of 4 substituted pyridine compounds from a mixture of alkylated pyridine compounds by selective oxidation thereof to isonicotinic acid. Still another object is the provision of a stepwise process for the preparation of pyridine carboxylic acids wherein a mixture of isomeric alkyl substituted pyridine compounds is first selectively oxidized to convert the 4-substituted compounds to isonicotinic acid and the unconverted alkyl substituted pyridine compounds are further oxidized in a second step to nicotinic acid and/or picolinic acid. These and other objects of my invention will be apparent from the ensuing description thereof.

In accordance with my invention, the heterocyclic nitrogen compound containing a pyridine nucleus substituted in the 4 position by an oxidizable organic grouping is oxidized with molecular oxygen in the liquid phase in the presence of a metallic oxidation catalyst at a temperature of 450° F. to 550° F. at a pressure at least sufficient to maintain liquid phase reaction conditions. In a preferred embodiment of my invention, the heterocyclic nitrogen compound is subjected to oxidation in a solvent comprising an oxidation-resistant mono-carboxylic acid.

My invention is characterized by the surprising discovery that, when the process, including conditions of temperature and pressure as more fully described hereinafter, is applied to isomeric alkyl substituted pyridines, for example those substituted in the 2 or in the 3 position, essentially no oxidation is effected, and the reactants are recovered from the reaction mixture essentially unchanged. My invention is particularly valuable for the preparation of isonicotinic acid by the oxidation of a mixture of isomeric alkyl substituted pyridine compounds, for example mixtures of isomeric picolines which are readily obtainable from coal tar sources. In accordance with my invention, the selective oxidation of 4-substituted organic pyridine compounds provides a simple and effective method for the preparation of one or more pyridine carboxylic acids from such isomeric mixtures by a process involving selective oxidation of the 4-substituted pyridine compounds, separation of the unoxidized 2 and/or 3 substituted isomers from the oxidized product and further oxidation of said isomers to picolinic and/or nicotinic acid.

Pyridine compounds oxidized to pyridine carboxylic acids in accordance with the invention comprise as a class the heterocyclic nitrogen compounds containing a pyridine nucleus substituted in the 4 position with an oxidizable organic grouping capable of being oxidized to a carboxylic acid group. Members of this class include compounds containing a pyridine nucleus wherein the 4 position is substituted by an alkyl hydrocarbon group of 1 to 8 carbon atoms, for example alkyl groups such as methyl, ethyl, n-amyl, isooctyl and the like. Pyridine compounds subjected to oxidation may be relatively pure or may be oxidized in admixture with one or more isomeric compounds substituted at other than the 4 position. Pyridine compounds which may be employed in the process of my invention may be obtained from natural sources, for example from pyrolysis products of coal, or may be synthetic products obtained, for example by the condensation of various unsaturated compounds or aliphatic alcohols or aldehydes with ammonia or by the alkylation of pyridine. The latter method is particularly valuable for the preparation of 4-ethyl pyridine which may be utilized as a feedstock in the present process. Particularly desirable alkyl pyridines comprise the methyl pyridines and particularly the mixture of isomeric methyl pyridines which are readily available from coal tar sources. The following detailed description of the invention will be made with particular reference to methyl pyridines as the preferred pyridine compounds containing an oxidizable substituent group which are subject to the conditions resulting in the obtaining of pyridine carboxylic acids. It is to be understood however that this is done with no intent to limit the source of the invention to the use of only these particularly referred to alkyl pyridine compounds as starting materials.

The oxidation is desirably conducted in the presence of a solvent medium which is preferably a mono-carboxylic acid. The acid should be one which is liquid at the reaction temperature. The aliphatic saturated mono-carboxylic acids having from 2 to 8 carbon atoms in the molecule and free of hydrogen atoms attached to tertiary carbon atoms are particularly advantageous as solvents since they have been found to be relatively stable or inert to oxidation in the reaction system.

The preferred solvent is acetic acid, usually employed in its glacial form. Although acetic acid is preferred, higher homologs such as propionic acid, butyric acid, etc. may be employed. Benzoic acid may be used. Mixtures of these acids may be used.

Those skilled in the art will appreciate that the volume of solvent employed should be adjusted so that the intermediate products of oxidation as well as unconverted pyridine compounds will be held in solution during the oxidation reaction, and so that the pyridine carboxylic acid product, which may be insoluble or partially insoluble in said solvent, may be readily recovered, for example by filtration from the oxidized reaction product. The volume of solvent utilized is not critical but typically will be in the range of from 0.5 to 10 times the weight of oxidizable starting material. Where the product is recovered by filtration from the reaction mixture it may contaminated by intermediates if the amount of solvent is too small. If the amount is too large the process is uneconomical.

The process of the invention is carried out in the presence of an oxidation catalyst, and for this purpose any of the known metallic oxidation catalysts may be employed. Suitable oxidation catalysts comprise in general, metals having an atomic weight of from about 50 to about 200 and more particularly compounds of the heavy metals. The metallic oxidation catalyst may be in the form of the elemental metal or may be introduced as the oxide or hydroxide of the metal but preferably comprises a salt which is soluble or partially soluble in the reaction mixture. Heavy metals, suitable compounds of which may be employed as the catalyst include, for example manganese, bismuth, cobalt, lead, copper, vanadium, tin, chromium, molybdenum, cerium, etc. Mixtures of metals may be employed. Cobalt and manganese are particularly effective as oxidation catalysts. Illustrative examples of particular compounds of heavy metals which may be employed include, for example the salts of saturated or unsaturated carboxylic acids such as cobalt acetate, manganese acetate, cobalt butyrate, manganese linoleate and the like; salts of alicyclic organic acids such as cobalt naphthenate, manganese naphthenate and the like; salts of aromatic carboxylic acids such as manganese benzoate, manganese toluate and the like, etc.

The amount of the catalyst present in the reaction mixture may be varied over wide limits. As little as 0.001% by the weight of the catalyst based on the pyridine compound undergoing oxidation may be employed and as much as 5% by weight of the catalyst may be used. The amount of the catalyst is preferably between 0.01% and about 2% by weight of the oxidizable pyridine compound furnished to the process.

As to the molecular oxygen-containing gas there may be employed substantially 100% oxygen gas or gaseous mixtures containing lower concentrations of oxygen. Such mixtures preferably have oxygen contents within the range of about 5% by volume to about 20% or more by volume. As such mixtures there may be employed air or air which has been diluted with a suitable inert gas such as nitrogen, $CO_2$ and the like, or corresponding mixtures prepared from substantially pure gaseous oxygen and such inert diluents may be used.

It has been found, in accordance with the invention, to be essential to employ a temperature that is above a certain minimum suitable temperature below which the desired reaction has not been found to occur. The minimum temperature which is employed is not below 450° F. and in general temperatures of 460° F. or above are preferred to effect the desired reaction to any practical extent. At more elevated temperatures, the rate of oxidation and the yield of desired product increase, but exceptionally high temperatures may result in non-selective oxidation of the feedstock to carbon dioxide and water. The oxidation is conveniently conducted at temperatures of from about 450° F. to 550° F. and preferably from about 450° F. to 500° F. It will be realized that the optimum temperature within the indicated range will depend to a certain extent upon the oxidation catalyst and associated reaction conditions as well as the particular feedstock being treated.

The process of the invention may be conducted at atmospheric or super-atmospheric pressure, the minimum pressure being dictated by the requirement that liquid phase reaction conditions be maintained at the particular temperature at which the oxidation is conducted. Depending upon the particular pyridine compound oxidized as well as the particular solvent employed, atmospheric pressure may be sufficient to insure that the reactants are substantially present in the liquid phase. Higher pressures may be employed, for example pressures from atmospheric up to about 1500 p.s.i.g. (pounds per square inch gauge). In the preferred mode of operation the pressure in the reaction vessel is adjusted so that at the operating temperature reflux conditions prevail in order that the refluxing solvent may aid in the dissipation of reaction heat.

The reaction time should be sufficient to obtain a desirable conversion of the substituted pyridine compound to the desired pyridine carboxylic acid, for example, in the range of from about 0.5 to 25 or more hours, preferably up to about 4 hours. It will be apparent to one skilled in the art that time and temperature are interrelated variables and that the time of reaction will depend upon the oxidation conditions as well as the degree of conversion which is desired.

The process of my invention may be carried out batchwise, intermittently or continuously. Where the process is carried out batchwise, the reaction vessel comprises a suitable container having means for controlling temperature and pressure and provided with an inlet for introducing molecular oxygen-containing gas below the surface of the liquid reactants and an outlet for removing inert or unreacted gases and a condenser for removing entrained or volatilized liquids from the gaseous effluent. The substituted pyridine compounds, for example 4-methyl pyridine together with solvent if one is employed, and the desired amount of metallic oxidation catalyst are charged to the reactor. Oxygen, for example air, is passed through the reaction mixture which should be vigorously agitated, for example, by means of the gaseous stream or additionally by means of a power driven stirrer in order to effect maximum contact of the oxygen with the oxidizable charge. The temperature is gradually raised from ambient temperature to the operating range, for example up to about 475° F., while maintaining a pressure of from atmospheric to about 1500 p.s.i.g. in the reactor. Appreciable oxidation occurs accompanied by exothermic heat of reaction, and the temperature is controlled to maintain the reaction within the desired temperature range. Unreacted oxygen and inert gases are continuously bled off to maintain the pressure within the desired limits, and the progress of the oxidation reaction may be readily determined by the analysis of the off-gases for oxygen content. When the oxygen content of the off-gases indicates that little or no oxygen is being taken up by the reaction mixture, the reactor is cooled and the pressure released. The reactor contents are then further cooled to about room temperature and precipitated isonicotinic acid is separated by filtration and may then be further purified, for example by recrystallization. The mother liquors containing unconverted 4-methyl pyridine and solvent are distilled and the recovered pyridine compound may be recycled to the oxidation reaction. The residue obtained from the distillation may be further processed for recovery of additional quantities of isonicotinic acid.

The following examples are offered in illustration of my invention but are not intended as a limitation thereof:

*Example 1*

A mixture of 50.3 g. (0.544 mol.) 4-picoline and 150 g. of glacial acetic acid was charged to a tubular reactor provided with gas inlet, overhead condenser and means for heating. To this was added a solution of 0.2 g. cobalt acetate and 0.4 g. manganese acetate in 6 ml. water, and the reaction mixture heated while introducing air beneath the surface at a rate of 0.13 cubic foot per minute. The pressure on the reactor was maintained at 400 p.s.i.g. Oxidation, as evidenced by reduction of the oxygen content of the exit gases, became appreciable at 466° F. The temperature was maintained at 470° F. to 485° F. until 14 cubic feet measured at standard temperature and pressure of air had passed through the reactor (2 hours).

The reactor contents were then cooled and the mixture filtered at 15° C., giving 37 g. of solid product melting at 315°–316° C. (sealed tube) without any purification and identified as isonicotinic acid. The mother liquors were distilled yielding 102 g. of overhead product boiling from 120–160° C. and 9 g. of viscous residue from which additional quantities of isonicotinic acid could be recovered. The yield of isonicotinic acid based on the 4-picoline charged was 54.3%.

*Example 2*

A mixture of 74.5 g. (0.8 mol.) 3-picoline, 150 g. acetic acid and a solution of 0.2 g. cobalt acetate and 0.4 g. manganese acetate in 6 ml. of water was heated under 400 p.s.i.g. with an inlet air flow of 0.13 cubic foot per minute. Over a 2-hour period at 400° F. there was no oxygen uptake; at 450° F. over a 2-hour period there was no oxygen uptake. At 500° F., the oxygen in the off-gases dropped from 20.8% to 19% and the $CO_2$ rose from 0% to 1%. After 1 hour the reactor was cooled and the contents distilled. 70 g. of unreacted 3-picoline were recovered and 1.3 g. of tarry material remained as a pot residue. No nicotinic acid was obtained.

*Example 3*

The procedure of Example 1 was repeated except that 2-methyl pyridine was used in place of 4-methyl pyridine. Under these conditions no oxidation to 2-carboxy pyridine occured and the 2-methyl pyridine was recovered unchanged.

*Example 4*

The procedure of Example 1 was repeated except that 29.8 g. of 4-(3-n-amyl) pyridine was used in place of 4-methylpyridine. Isonicotinic acid was obtained in a yield of 63%.

*Example 5*

A mixture of 93.12 g. (1 mol) mixed 2,3 and 4-methyl-pyridines, 150 g. of glacial acetic acid and 6 ml. of an aqueous solution containing 0.2 g. of cobalt acetate and 0.4 g. manganese acetate was oxidized at 400 p.s.i.g. with air at 470–480° F. Oxygen in the off-gases dropped to 10%, then rose to 19.6% during passage of 22 cubic feet of air through the reactor. The reactor contents were cooled and filtered, and the solids recrystallized from water. The yield of isonicotinic acid melting at 314–315° C. (sealed tube) was 61%.

My invention is associated with the surprising discovery that under the process conditions of the invention, only 4-substituted pyridine compounds can be oxidized to the corresponding carboxylic acid. As will be apparent from the illustrative examples given above, I have found that pyridine compounds substituted in the 2 or the 3-position cannot be oxidized under the prescribed conditions to the corresponding carboxylic acids. Further, in applying the process of my invention to mixtures of substituted pyridines, as shown by Example 5 above, I have found that only the pyridines substituted in the 4-position will be oxidized. The method of the invention is thus particularly applicable to the preparation of both isonicotinic acid and other pyridine carboxylic acids from mixtures of isomeric pyridine compounds.

Mixtures of isomeric substituted pyridine compounds may be subjected to the process of my invention. Particularly advantageous feed stocks are the mixtures of methyl pyridines or picolines obtained as a by-product from coal tar sources. Such a mixture containing all three methyl pyridine isomers may be oxidized as such, or preferably fractionated to separate 2-methyl pyridine which has a boiling point of 128.8° C. and a mixture of 3-methyl and 4-methyl pyridines which boil respectively at 143.5° C. and 143.1° C. and which cannot be conveniently separated by fractional distillation.

When applying the process of my invention to such a mixture of 3-methyl and 4-methyl pyridines, the oxidation is conducted in the manner already described. After completion of the oxidation as determined by the cessation of oxygen uptake, the reaction product is cooled and the isonicotinic acid which crystallizes therefrom is separated by filtration. The mother liquor is distilled to obtain an overhead fraction comprising acetic acid and a fraction comprising an azeotrope of acetic acid and unoxidized 3-methyl pyridine together with minor amounts of unoxidized 4-methyl pyridine. The recovered 3-methyl pyridine fraction is then subjected to further oxidation, for example by means of aqueous potassium permanganate, nitric acid or sulfuric acid or mixtures thereof or by other methods known in the art. The resulting pyridine carboxylic acid may be further purified in known manner to obtain high yields of substantially pure nicotinic acid.

Although in the foregoing examples, the runs were conducted in a batchwise manner, it will be appreciated that a continuous method of operation may be employed, in which a portion of the reaction mixture is withdrawn from the reactor continuously or intermittently, isonicotinic acid is separated therefrom, and unconsumed alkyl pyridine compounds are returned, and fresh feed is supplied to the reactor in amounts sufficient to maintain the desired concentration of oxidizable feedstock in the reactor. The ratio of the total oxygen feed into the reaction mixture relative to the pyridine compound may be varied over wide limits, and desirably a substantial excess of oxygen over that required to effect the desired conversion is utilized. The oxidation may be carried to substantial completion, that is, to the point at which no further oxygen is absorbed, or may be interrupted when any desired degree of conversion is achieved. The desired product can be recovered from the reaction mixture by any suitable method, for example by filtration from the reaction product. If desired, the pyridine carboxylic acid may be recovered from the reaction mixture by extraction with an aqueous solution of an alkali and acidification of the extract to regenerate the acid from its salt. Other methods of recovery include selective solvent extraction, conversion to insoluble derivatives such as the copper salt, and like methods.

Having described my invention, what I claim is:

1. The process for the production of isonicotinic acid which comprises oxidizing a 4-alkyl pyridine compound wherein the alkyl substituent comprises an oxidizable hydrocarbon group of from 1 to 8 carbon atoms in the liquid phase with molecular oxygen in the presence of a solvent comprising a mono-carboxylic acid having from 2 to 8 carbon atoms in the molecule and in the presence of from about 0.001% to about 5% by weight of a metallic oxidation catalyst comprising essentially as the sole effective catalytic ingredient thereof a heavy metal salt of a carboxylic acid at a temperature of from about 450° F. to about 550° F. and at a pressure at least sufficient to maintain liquid phase reaction conditions.

2. The process of claim 1 wherein the oxidation is effected in the presence of a solvent comprising a saturated aliphatic mono-carboxylic acid having from 2 to 8 carbon atoms in the molecule.

3. The process of claim 2 wherein a ratio of 0.5 to 10 parts by weight of acetic acid is utilized per part of alkyl pyridine compound.

4. The process of claim 2 wherein the catalyst is selected from the group consisting of cobalt salts, manganese salts and mixtures thereof.

5. The process for the production of isonicotinic acid which comprises oxidizing 4-methyl pyridine with molecular oxygen in the liquid phase in the presence of from about 0.5 to about 10 parts by weight of a solvent comprising a lower saturated aliphatic mono-carboxylic acid having from 2 to 8 carbon atoms in the molecule and in the presence of from about 0.01 to about 2% by weight of a metallic salt oxidation catalyst comprising essentially as the sole effective catalytic ingredient thereof a heavy metal salt of a carboxylic acid at a temperature of from about 450° F. to about 550° F. and at a pressure from atmospheric to about 1500 p.s.i.g.

6. The process of claim 5 wherein acetic acid is utilized as the solvent.

7. The process of claim 5 wherein the catalyst is a mixture of cobalt and manganese salts.

8. The process for the production of pyridine carboxylic acids which comprises oxidizing a feedstock containing 4-methyl pyridine in admixture with at least one other isomeric methyl pyridine in the liquid phase with molecular oxygen in the presence of a lower saturated aliphatic acid as solvent and in the presence of a metallic oxidation catalyst comprising essentially as the sole effective catalytic ingredient thereof a heavy metal salt of a carboxylic acid at a temperature of about 450° F. to about 550° F. and a pressure at least sufficient to maintain liquid phase reaction conditions, separating isonicotinic acid as a principal oxidation product, recovering unconverted methyl pyridine compounds from the oxidized reaction product, and subjecting the recovered methyl pyridine compounds to further oxidation to produce pyridine carboxylic acids.

9. The process of claim 8 wherein the feedstock comprises a mixture of 3-methyl pyridine and 4-methyl pyridine and wherein isonicotinic acid and nicotinic acid are recovered as the principal oxidation products.

References Cited in the file of this patent
UNITED STATES PATENTS

| | | |
|---|---|---|
| 2,245,528 | Loder | June 10, 1941 |
| 2,437,938 | Cislak et al. | Mar. 16, 1948 |
| 2,833,778 | Saffer et al. | May 6, 1958 |